(12) United States Patent
Park (10) Patent No.: US 12,175,730 B2
(45) Date of Patent: Dec. 24, 2024

(54) IMAGE LEARNING METHOD, APPARATUS, PROGRAM, AND RECORDING MEDIUM USING GENERATIVE ADVERSARIAL NETWORK

(71) Applicant: PROMEDIUS INC., Seoul (KR)

(72) Inventor: Geon Yeong Park, Seoul (KR)

(73) Assignee: PROMEDIUS INC., Seoul (KR)

( * ) Notice: Subject to any disclaimer, the term of this patent is extended or adjusted under 35 U.S.C. 154(b) by 420 days.

(21) Appl. No.: 17/705,937

(22) Filed: Mar. 28, 2022

(65) Prior Publication Data

US 2023/0154165 A1    May 18, 2023

Related U.S. Application Data

(63) Continuation of application No. PCT/KR2022/095053, filed on Mar. 11, 2022.

(30) Foreign Application Priority Data

Nov. 12, 2021    (KR) .................. 10-2021-0155888

(51) Int. Cl.
G06F 17/00        (2019.01)
G06N 3/045        (2023.01)
G06T 7/00         (2017.01)
G06V 10/774       (2022.01)
G06V 10/82        (2022.01)

(52) U.S. Cl.
CPC ......... *G06V 10/7747* (2022.01); *G06N 3/045* (2023.01); *G06T 7/0012* (2013.01); *G06V 10/82* (2022.01); *G06T 2207/10081* (2013.01)

(58) Field of Classification Search
CPC .... G06V 10/7747; G06V 10/82; G06N 3/045; G06T 7/0012; G06T 2207/10081
See application file for complete search history.

(56) References Cited

U.S. PATENT DOCUMENTS

| | | | |
|---|---|---|---|
| 10,825,219 B2* | 11/2020 | Fu | G06V 40/16 |
| 11,645,833 B2* | 5/2023 | Madani | G06F 18/2155 |
| | | | 382/132 |
| 2018/0260957 A1* | 9/2018 | Yang | G06T 7/143 |
| 2019/0295302 A1* | 9/2019 | Fu | G06T 11/00 |
| 2021/0043331 A1* | 2/2021 | Ozcan | G06V 10/764 |
| 2022/0076075 A1* | 3/2022 | Madani | G06F 18/2155 |
| 2022/0130019 A1* | 4/2022 | Jeong | G06F 21/32 |
| 2022/0327657 A1* | 10/2022 | Zheng | G06V 10/82 |

FOREIGN PATENT DOCUMENTS

KR    10-2021-0081805 A    7/2021

* cited by examiner

*Primary Examiner* — Mohammed H Zuberi
(74) *Attorney, Agent, or Firm* — Studebaker & Brackett PC (57) ABSTRACT

The present disclosure relates to image learning method, apparatus, program, and recording medium using a generative adversarial network.

The present disclosure allows to learn various images as well as medical radiographic images to maintain structural information on the basis of a generative adversarial network. The present disclosure prevents the structural information of the generated image with respect to an original image from being lost, and improves image qualities, such as resolution, noise degree, contrast, etc. to the level of a target reference dataset. When the present disclosure is used for image standardization, medical radiographic images imaged by different institutions and any number of image datasets having various qualities can be standardized universally.

16 Claims, 4 Drawing Sheets

IMAGE LEARNING METHOD, APPARATUS, PROGRAM, AND RECORDING MEDIUM USING GENERATIVE ADVERSARIAL NETWORK

CROSS-REFERENCE TO RELATED APPLICATION

The present application is a continuation of International Patent Application No. PCT/KR2022/095053, filed on Mar. 11, 2022, which is based upon and claims the benefit of priority to Korean Patent Application No. 10-2021-0155888 filed on Nov. 12, 2021. The disclosures of the above-listed applications are hereby incorporated by reference herein in their entirety.

BACKGROUND

1. Technical Field

The present disclosure relates to image learning method, apparatus, program, and recording medium using a generative adversarial network.

2. Description of Related Art

A medical radiographic image refers to an image obtained to gather information on the internal structure of the body using radiation. A medical imaging device used to obtain such a medical radiographic image is a non-invasive inspection device, which images and processes structural details, internal tissues, and flows of fluid within a body, and displays the result to a user. For example, a medical radiographic imaging device includes an X-ray imaging device for irradiating X-rays to an object and detecting X-rays passing through the object to form an image, and a computed tomography (CT) device, and the like.

Recently, a medical diagnosis method for identifying and predicting a disease by analyzing a medical radiographic image using artificial intelligence based on deep learning technology has been developed. With an increase of the remote medical market all over the world, the need for non-facing medical treatment has been raised, and so, application of and demand for a medical radiographic image using the artificial intelligence are increasing.

However, since institutions performing imaging, such as hospitals or the like, differ from one another in imaging devices or detailed environments related to imaging, the medical radiographic images may have different qualities. In this instance, since the machine learning method, such as deep learning, is limited to a single data domain, a model learned through a combination of specific medical radiographic image datasets may be overfitting, so that there it may be difficult to clinically utilize the learned model to a medical radiographic image dataset of another institution, which has a difference in quality.

In order to solve such a problem, a method for learning various additional medical radiographic image datasets can be considered, but it may be difficult to secure the performance of a model due to variance in resolution and image quality, and enormous expenses may be incurred to secure all medical radiographic image datasets which are likely to be input. In addition, in the case of a method for learning an artificial intelligence model by each medical radiographic image dataset, since each institution requires a large-scale dataset to secure sufficient performance of all models, it reduces the possibility of a realistic application.

In order to solve the above problems, it is also possible to consider the use of traditional image processing techniques (e.g., histogram matching, pixel normalization, etc.) to standardize pixel intensity and resolution distribution of each image dataset. However, in the case of the above-mentioned techniques, a user must directly tune variables required for standardization, and it is difficult to ensure optimal performance since it is difficult to utilize the detailed characteristics of the dataset.

SUMMARY

The present disclosure provides image learning method, apparatus, program, and recording medium for learning various images as well as medical radiographic images to maintain structural information on the basis of a generative adversarial network, thereby being applicable to learning images having various qualities and being also applicable to standardization of datasets having different imaging regions and regions of interest.

The aspects of the present disclosure are not limited to those mentioned above, and other aspects not mentioned herein will be clearly understood by those skilled in the art from the following description.

To accomplish the above objects, in an aspect of the present disclosure, there is provided an image learning method performed by an image learning apparatus using a generative adversarial network, the image learning method including the operations of: inputting a source domain image and a reference domain image having specific structural information to a mapping neural network training to maximize a loss of a discriminator neural network, obtaining an image style vector of a target reference dataset through an output of the mapping neural network, and providing the obtained image style vector to a generator neural network; training to maximize the loss of the discriminator neural network and providing a target domain vector to the generator neural network performing image conversion using the image style vector to obtain a first domain conversion image having different structural information as an output of the discriminator neural network; obtaining a second domain conversion image, in which a specific area is randomly emphasized, through a label map-based data random segmentation augmentation of an original image with respect to the first domain conversion image; and training to minimize the loss of the discriminator neural network, providing the second domain conversion image as the input image to the discriminator neural network discriminating the input image as any one among a domain generated by the generator neural network and a target domain, and inversely propagating the loss of the discriminator neural network to the mapping neural network and the generator neural network.

In this instance, the loss of the discriminator neural network includes adversarial loss and domain classification loss.

Moreover, the generator neural network and the mapping neural network are trained to discriminate the second domain conversion image as the target domain by the discriminator neural network, and the discriminator neural network is trained such that the second domain conversion image is discriminated as a domain generated by the generator neural network.

Furthermore, cyclic losses of the generator neural network are opposed to each other.

Additionally, the image learning method further includes the operations of: inversely propagating a semantic segmentation loss due to the label map-based data random segmentation augmentation to the mapping neural network and the generator neural network, wherein the mapping neural network and the generator neural network are trained by following a dice loss between the second domain conversion image and the label map of the original image.

In another aspect of the present disclosure, there is provided an image learning apparatus using a generative adversarial network including: a mapping neural network, training to maximize a loss of a discriminator neural network, and obtains an image style vector of a target reference dataset and provides the obtained image style vector to a generator neural network when a source domain image and a reference domain image having specific structural information is input; the generator neural network, training to maximize a loss of the discriminator neural network, performs image conversion using the image style vector, and outputs a first domain conversion image having different structural information when a target domain vector is input; a segmentation augmentation unit outputting a second domain conversion image, in which a specific area is randomly emphasized, through a label map-based data random segmentation augmentation of an original image with respect to the first domain conversion image; and the discriminator neural network, training to minimize a loss of the discriminator neural network, discriminates the second domain conversion image input through the segmentation augmentation unit as any one among a domain generated by the generator neural network and a target domain, and inversely propagates the loss of the discriminator neural network to the mapping neural network and the generator neural network.

In this instance, the loss of the discriminator neural network includes adversarial loss and domain classification loss.

Moreover, the generator neural network and the mapping neural network are trained to discriminate the second domain conversion image as the target domain by the discriminator neural network.

Furthermore, cyclic losses of the generator neural network are opposed to each other.

Additionally, a semantic segmentation loss due to the label map-based data random segmentation augmentation is inversely propagated to the mapping neural network and the generator neural network, and the mapping neural network and the generator neural network are trained by following a dice loss between the second domain conversion image and the label map of the original image.

In another aspect of the present invention, there is provided a computer program combined with a computer and stored in a computer-readable recording medium to execute the image learning method using a generative adversarial network.

In a still another aspect of the present invention, there is provided a computer-readable recording medium storing a computer program, when the computer program is executed by a processor, the computer-readable recording medium including the operations of: inputting a source domain image and a reference domain image having specific structural information to a mapping neural network training to maximize a loss of a discriminator neural network, obtaining an image style vector of a target reference dataset through an output of the mapping neural network, and providing the obtained image style vector to a generator neural network; training to maximize the loss of the discriminator neural network and providing a target domain vector to the generator neural network performing image conversion using the image style vector to obtain a first domain conversion image having different structural information as an output of the discriminator neural network; obtaining a second domain conversion image, in which a specific area is randomly emphasized, through a label map-based data random segmentation augmentation of an original image with respect to the first domain conversion image; and training to minimize the loss of the discriminator neural network, providing the second domain conversion image as the input image to the discriminator neural network discriminating the input image as any one among a domain generated by the generator neural network and a target domain, and inversely propagating the loss of the discriminator neural network to the mapping neural network and the generator neural network.

In this instance, the loss of the discriminator neural network includes adversarial loss and domain classification loss.

Moreover, the generator neural network and the mapping neural network are trained to discriminate the second domain conversion image as the target domain by the discriminator neural network.

Furthermore, cyclic losses of the generator neural network are opposed to each other.

In addition, a semantic segmentation loss due to the label map-based data random segmentation augmentation is inversely propagated to the mapping neural network and the generator neural network, and the mapping neural network and the generator neural network are trained by following a dice loss between the second domain conversion image and the label map of the original image.

DETAILED DESCRIPTION

Advantages and features of the present disclosure and methods accomplishing the advantages and features will become apparent from the following detailed description of exemplary embodiments with reference to the accompanying drawings. However, the present disclosure is not limited to exemplary embodiment disclosed herein but will be implemented in various forms. The exemplary embodiments are provided so that the present disclosure is completely disclosed, and a person of ordinary skilled in the art can fully understand the scope of the present disclosure. Therefore, the present disclosure will be defined only by the scope of the appended claims.

The terms used herein will be described briefly, and the present disclosure will be described in detail.

The terms used herein is defined in consideration of the function of corresponding components used in the present disclosure and may be varied according to users, operator's intention, or practices. In addition, an arbitrary defined term may be used in a specific case and will be described in detail in a corresponding description paragraph. Also, some terms may be arbitrarily selected by the applicant, and in this case, the meaning of the selected terms will be described in detail in the detailed description of the invention. Therefore, the terms used herein have to be defined based on the meaning of the terms together with the description throughout the specification.

Throughout the specification, unless explicitly described to the contrary, the word "comprise" and variations such as "comprises" or "comprising" will be understood to imply the inclusion of stated elements but not the exclusion of any other elements.

The term, "unit", used in the present disclosure means a hardware element, such as software, FPGA, or ASIC, and the "unit" performs some roles. However, the term, "unit", is not limited to software or hardware. The "unit" may be configured in an addressable storage medium or may be configured to play one or more processors. Therefore, as an example, a "unit" includes elements, such as software elements, object-oriented software elements, class elements, and task elements, processes, functions, attributes, procedures, subroutines, segments of program codes, drivers, firmware, microcode, circuits, data, databases, data structures, tables, arrays, and variables. Functions provided within the elements and "units" may be combined with a smaller number of elements and "units" or may be further divided into additional elements and "units".

In the present disclosure, it is possible to consider standardization based on a generative adversarial network (GAN) loss in standardizing a number of image datasets having various qualities, such as medical radiographic images imaged by various institutions. That is, it is to learn a model so that the distribution of an image generated on the basis of a given dataset coincides with the distribution of the actual target reference image dataset. However, if a general generative adversarial network is used, it is impossible to apply to the standardization of datasets different in imaging, and region of interest (ROI) since the general generative adversarial network is specialized in reducing local resolution, noise information, contrast, and the like of the datasets. For instance, in the case of a medical radiographic image, in the actual clinical situation, there is a clear difference in the phase, the region of interest, and the field of view (FOV) of the datasets due to a deviation in characteristics of a patient, imaging purposes, and thus, detail protocols of radiographic apparatuses, and images even in the case of imaging similar regions have significantly different structural information. In this instance, when the generative adversarial network-based method is applied as it is, even though there is a clear difference between the coordinate phase information of the image generated on the basis of a given original dataset and that of the target reference image dataset, the generated image can completely lose structural information of the original image. Therefore, the method for applying the generative adversarial network-based method has a clear limitation in clinical application since being limitingly applicable to datasets in which there is not a huge difference in regions of interest and structural information according to the regions of interest.

According to an embodiment of the present disclosure, provided are image learning method and apparatus for learning various images as well as medical radiographic images to maintain structural information using a generative adversarial network.

Hereinafter, an embodiment of the present disclosure will be described in detail with reference to the accompanying drawings so that those skilled in the art can easily accomplish the present disclosure. Additionally, irrelevant portions will be omitted in order to clearly explain the present disclosure.

In the present disclosure, the term, 'image', means multi-dimensional data having discrete image elements (e.g., pixels in a two-dimensional image and voxels in a three-dimensional image).

Figure 1:
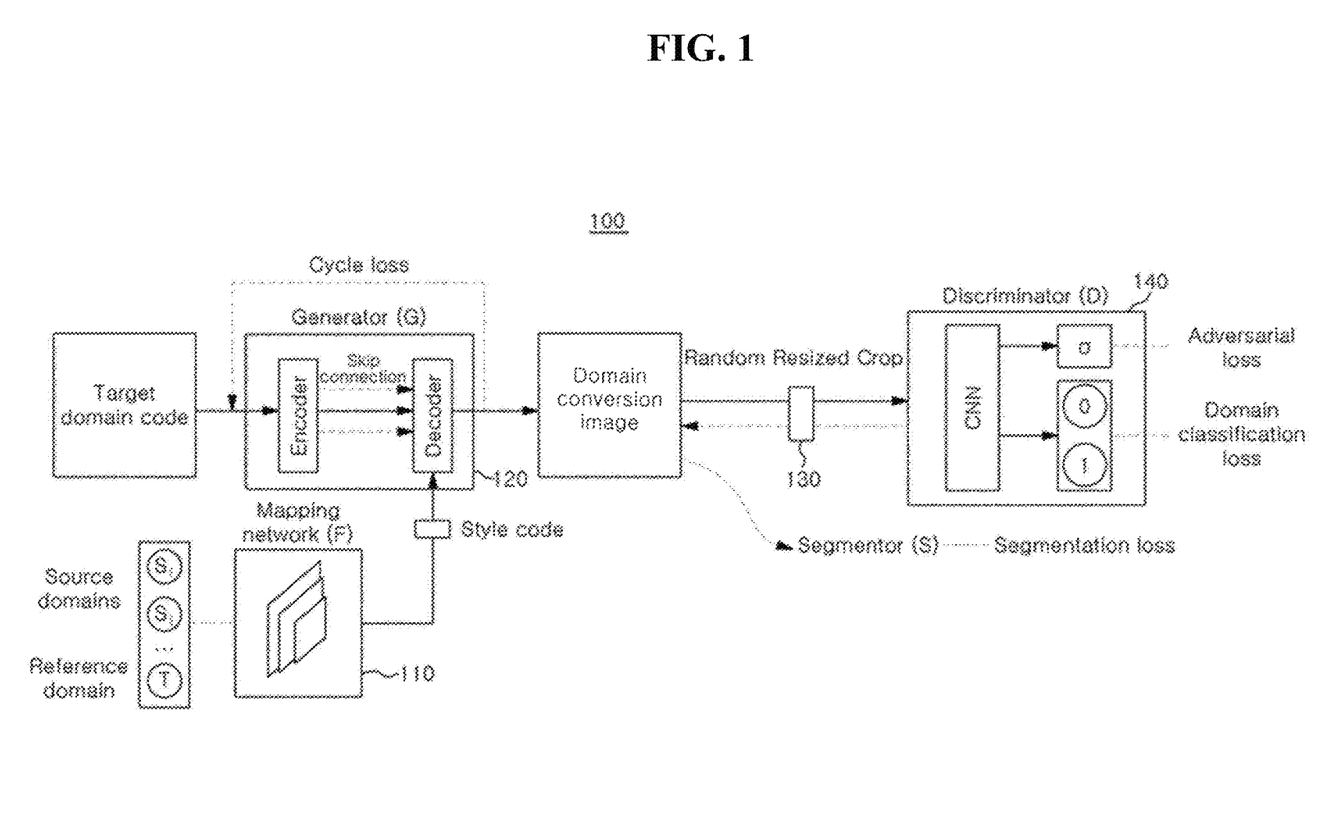
FIG. 1 is a block diagram of an image learning apparatus using a generative adversarial network according to an embodiment of the present disclosure.

FIG. 1 is a block diagram of an image learning apparatus 100 using a generative adversarial network according to an embodiment of the present disclosure. The matters shown in FIG. 1 are just illustrated. The image learning apparatus 100 can be implemented in a PC, a server, or the like.

Referring to FIG. 1, the image learning apparatus 100 using a generative adversarial network includes a mapping neural network 110, a generator neural network 120, a segmentation augmentation unit 130, and a discriminator neural network 140.

The mapping neural network 110 is trained to maximize the loss of the discriminator neural network 140, and obtains an image style vector of a target reference dataset and provides the image style vector to a generator neural network 120 when a source domain image and a reference domain image having specific structural information are input. The mapping neural network 110 can be learned so that a domain conversion image, in which a specific region is emphasized by the segmentation augmentation unit 130, is determined as a target domain by the discriminator neural network 140.

The generator neural network 120 is trained to maximize the loss of the discriminator neural network 140, performs image conversion using the image style vector of the target reference dataset, and outputs a domain conversion image having different structural information when the target domain vector is input. Such a cyclic loss of the generator neural network 120 can induce a mapping function by opposite style vectors to form an inverse relationship.

The segmentation augmentation unit 130 randomly outputs a domain conversion image, in which a specific area is emphasized, through the label map-based data random segmentation augmentation of the original image with respect to the domain conversion image. Here, a semantic segmentation loss due to the label map-based data random segmentation augmentation can be inversely propagated to the mapping neural network 110 and the generator neural network 120, and the mapping neural network 110 and the generator neural network 120 can learn by following a dice loss between a domain conversion image, in which a specific area is emphasized, and the label map of the original image.

The discriminator neural network 140 is trained to minimize loss, and when the domain conversion image in which a specific region is emphasized is input, determines the domain conversion image as any one among a domain generated by the generator neural network 120 and a target domain, and inversely propagates its loss to the mapping neural network 110 and the generator neural network 120. The loss of the discriminator neural network 140 may include adversarial loss and domain classification loss. In addition, the discriminator neural network 140 can learn to determine a domain conversion image, in which a specific area is emphasized by the segmentation augmentation unit 130, as a domain generated by the generator neural network 120.

Figure 2:
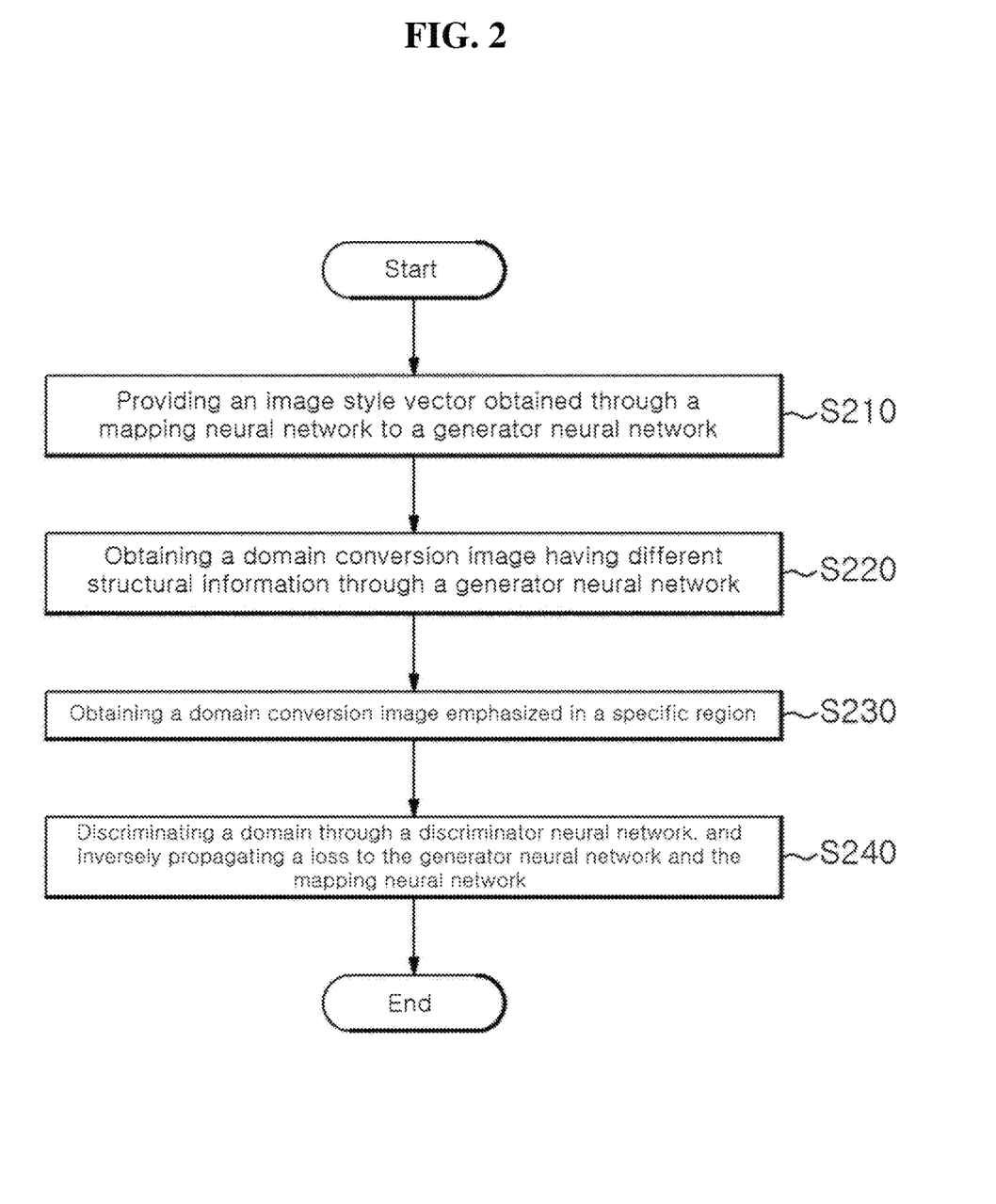
FIG. 2 is a flow chart illustrating an image learning method performed by the image learning apparatus using a generative adversarial network according to an embodiment of the present disclosure.
Figure 3:
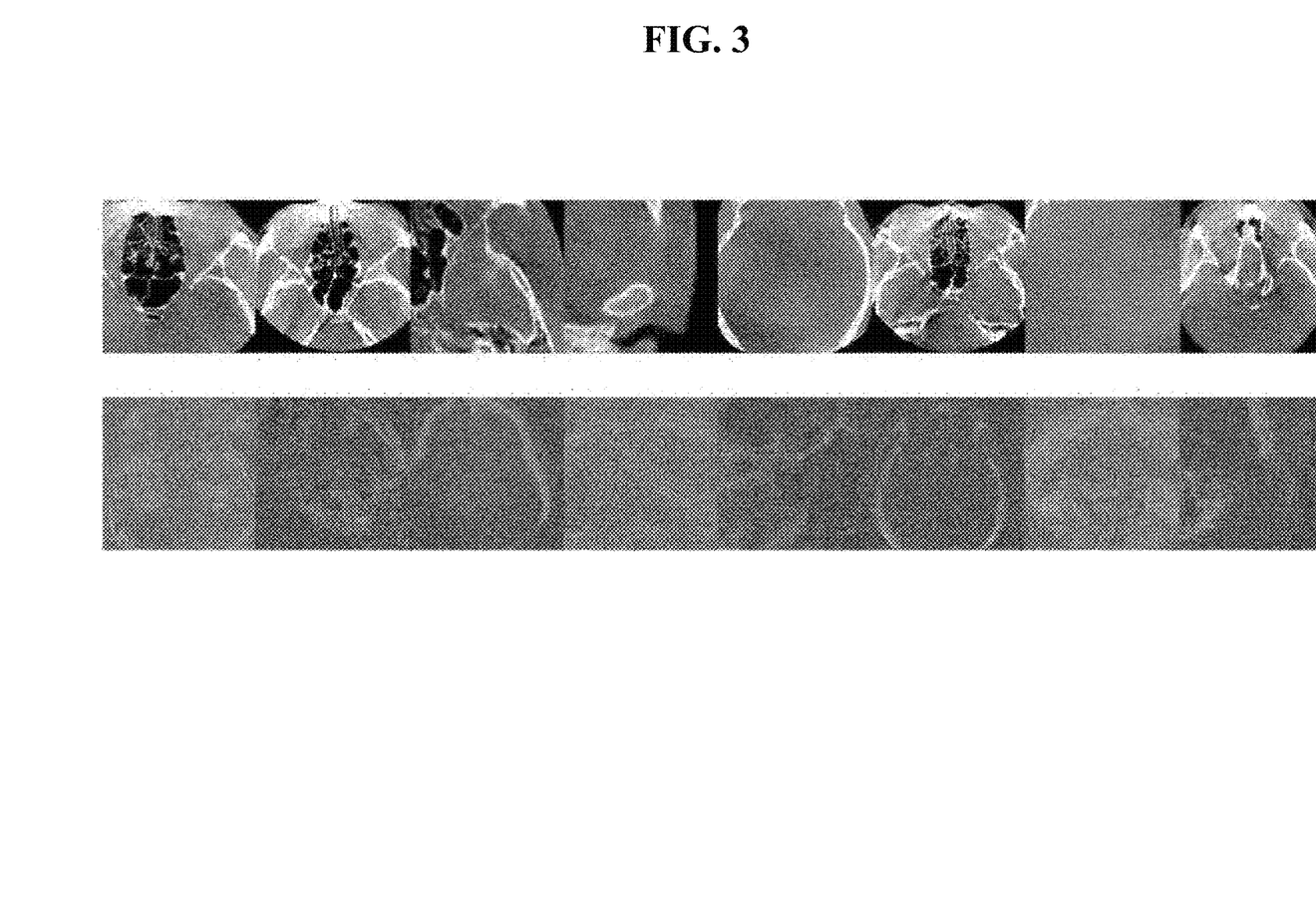
FIG. 3 is an exemplary view illustrating a label map-based data random segmentation augmentation technique applied to computerized tomography of a medical radiographic image according to an embodiment of the present disclosure.
Figure 4:
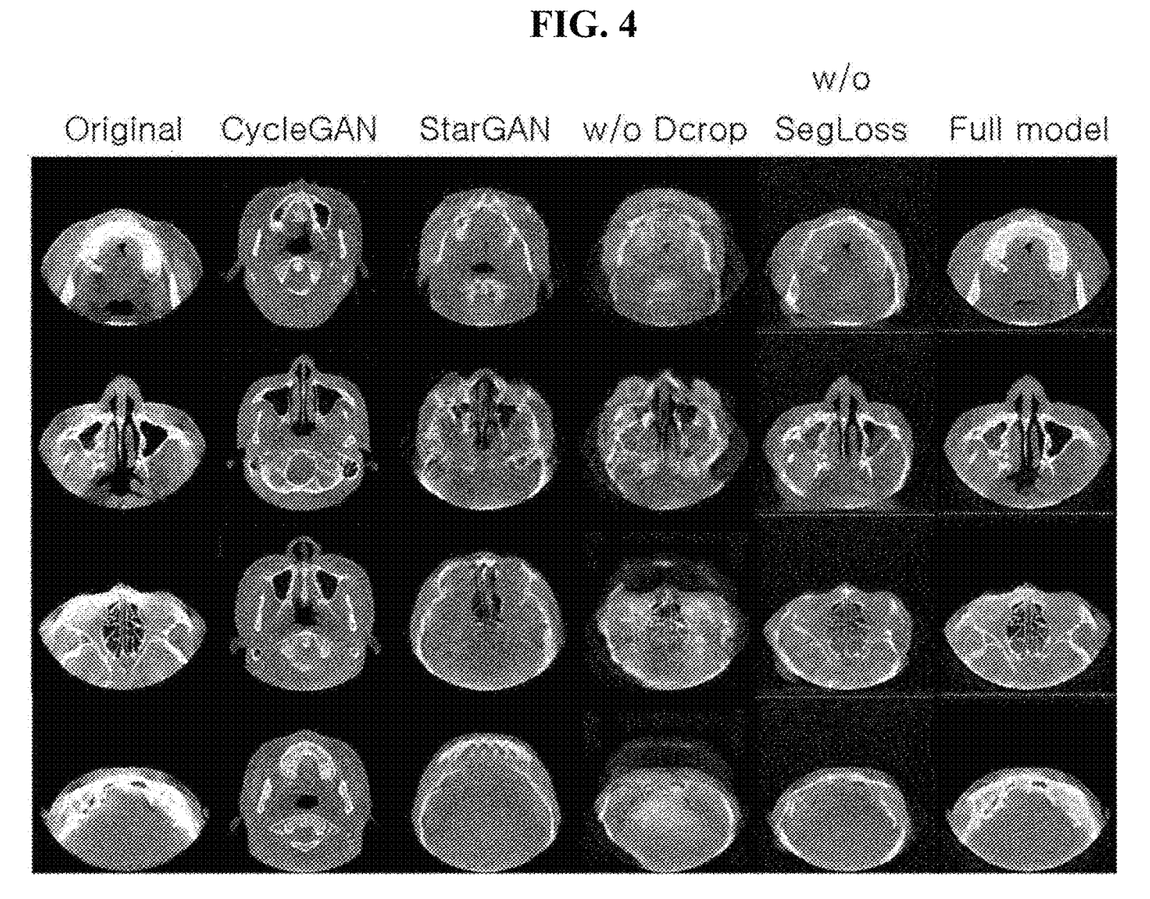
FIG. 4 is an exemplary view comparing the performance obtained when the image learning method according to an embodiment of the present disclosure is applied to computerized tomography among medical radiographic images with the performance of different image standardization techniques.

FIG. 2 is a flow chart illustrating an image learning method performed by the image learning apparatus using a generative adversarial network according to an embodiment of the present disclosure, FIG. 3 is an exemplary view illustrating that a label map-based data random segmentation augmentation technique to a computerized tomography of a medical radiographic image according to an embodiment of the present disclosure, and FIG. 4 is an exemplary view comparing the performance obtained when the image learning method according to an embodiment of the present disclosure is applied to computerized tomography among medical radiographic images with the performance of different image standardization techniques.

Hereinafter, an image learning method performed by the image learning apparatus 100 using a generative adversarial network according to an embodiment of the present disclosure will be described in detail with reference to FIGS. 1 to 4.

As described above, when the method based on the general generative adversarial network is applied to learning images having various qualities and being applicable to standardization of datasets different in overall imaging regions and regions of interest, a difference in structural information between the datasets may be mistook as an object for standardization so that important structural information which is clinically meaningful in the original image may be damaged. However, the embodiment of the present disclosure preserves the structural information difference as an important signal on the basis of application of label map-based data random segmentation augmentation and introduction of the semantic segmentation loss.

First, an image style vector of a target reference dataset is extracted through the mapping neural network 110, and the extracted image style vector is provided to the generator neural network 120 to be transplanted to a decoder in the generator neural network 120 (S210).

When two domains are defined as A and B, learning (G: (X, V')→X') is performed with respect to a generator neural network (G) 120 converting an image of one domain into an image of another domain, wherein X is an original image and mainly corresponds to an unspecified number of domain sets excluding the target reference domain, but is not limited thereto, V' means a style vector of a target reference domain and mainly a vector of the target reference domain, and X' means a converted image. If an image X_A of A is converted through a style vector V_B of B, an output image can be defined as X'_B.

The learning process of the generator neural network 120 includes a learning process for a discriminator neural network (D) 140 discriminating a measured input image from a synthesized image of the generator neural network 120.

According to the method based on the general generative adversarial network, the generator neural network (G), the discriminator neural network (D), and a mapping neural network (F) can be learned by solving a minimum-maximum problem such as Mathematical Equation 1.

$$\min_{G,F} \max_{D} E_x[\log D_{adv}(x)] +$$
$$E_{x,c}[\log 1 - D_{adv}(G(x, F(c)))]$$
[Mathematical Equation 1]

In Mathematical Equation 1, the generator neural network (G) and the mapping neural network (F) learn such that an image output after a given input image is converted becomes similar to an image of an actual target (primarily, a target reference) domain, whereas the discriminator neural network (D) learns to discriminate the generated image from the actual target domain.

In this instance, if the general adversarial loss is used as it is, since the learning process is unstable due to the minimum-maximum problem, a log-likelihood loss based on the maximum likelihood method is replaced with a loss function of a Wasserstein GaN-Gradient Penalty (WGAN-GP).

The adversarial loss outputs a realistic image on the basis of a given input image and induces to ultimately deceive the learned discriminator neural network 140. However, the goal of image standardization is to make it difficult to discriminate the output image by replicating the quality of the actual image of the target reference domain and the image of the target reference domain, beyond realistic expression of the output image of the generator neural network 120. In order to achieve the above, the discriminator neural network 140 includes domain classification loss, and the domain classification loss is defined as Mathematical Equation 2.

$$L_{cls}^D = E_{x,c'}[-\log D_{cls}(c'|x)]$$

$$L_{cls}^{G,F} = E_{x,c}[-\log D_{cls}(c|G)(x,F(c)))]$$ [Mathematical Equation 2]

In Mathematical Equation 2, the generator neural network 120 and the mapping neural network 110 learn such that an image output after a given input image is converted is classified not as an original domain but as a target domain, and the discriminator neural network 140 learns to correctly discriminate domains of images. In this instance, when the learned generator neural network 120 and the learned mapping neural network 110 are utilized in the actual clinical stage, the input image is always converted and normalized to the target reference domain.

The domain classification loss induces the output image of the generator neural network 120 to be similar to the image of the target domain (ultimately, the target reference domain) as well as to be realistic. However, one of the limitations of the generative adversarial network in image conversion is that all output images may be converged to several specific images since mode collapsing occurs during a learning process due to the minimum-maximum problem. That is, if all output images are realistic enough to deceive the discriminator neural network 140 regardless of the input, and are united to a single image similar to the image of the target domain, the generator neural network 120 can optimize the adversarial loss and the domain classification loss, and thus, preventive measures are required. Accordingly, in order to put the input image and the output image in one-to-one correspondence and prevent the mode collapsing, the cyclic loss is defined as Mathematical Equation 3.

$$L_{cyc} = E_{x,c,c'}[\|x - G(G(x,F(c)),F(c'))\|]$$ [Mathematical Equation 3]

Here, ‖ ‖ means l1-norm.

The cyclic loss induces a mapping function by a style vector opposite to each other to form an inverse relationship. The introduction of the loss plays a role of normalizing the generator neural network 120 so that an image unrelated to the input image is not output. However, as described above, when there is a difference in structural information between the datasets, problems such as mode collapsing may still occur.

When a specific domain image is converted into an image of a target reference domain, if there is a great difference in structural information between datasets, the discriminator neural network 140 detects the difference between the datasets to easily grasp a domain of the input image. Therefore, in order to deceive the discriminator neural network 140 by the generator neural network 120, it is inevitable to output an image having damaged structural information of the dataset.

The present disclosure includes the operations of: (S220) obtaining a domain conversion image having different structural information with respect to a target domain vector through a generator neural network 120 in which an image style vector of a target reference dataset is transplanted; and (S230) applying a label map-based data random segmentation augmentation technique to an input image of the discriminator neural network 140 by the segmentation augmentation unit 130 in order to induce the discriminator neural network 140 to concentrate not on a change in structural information but on image quality characteristics, such as local resolution, noise degree, contrast, and the like.

FIG. 2 is an exemplary view of introducing a segmentation augmentation technique to an actual input image and a generated input image of a discriminator. When a random segmentation augmentation is applied across the image, the augmented image randomly emphasizes a specific region. Accordingly, latent representations of the discriminator neural network 140 with respect to the augmented image include information on local image quality having a relatively higher reliability at higher proportion than the entire structural information of the original image. Accordingly, the generator neural network 120 converts an image in a direction which selectively standardizes image quality, such as texture features, while maintaining the structural characteristics of the original image.

Moreover, in the embodiment of the present disclosure, in order to solve the above problems, the semantic segmentation loss of the generated image is defined as Mathematical Equation 4 based on the label map of the original image in the output image of the generator neural network 120.

$$L_{seg}=E_{(x,y),c}[DICE(S(G(x,F(c)),y)]$$ [Mathematical Equation 4]

In Mathematical Equation 4, the generator neural network (G) 120 and the mapping neural network (F) 110 optimize a dice loss by following the dice loss between an original image-based conversion image and an original label map. To achieve the above, the adversarial loss and the domain classification loss of the discriminator generation network 140 and the semantic segmentation loss of the segmentation augmentation unit 130 are inversely propagated to the mapping neural network 110 and the discriminator neural network 120 (S240). Accordingly, the generator neural network 120 and the mapping neural network 110 are trained in a direction in which the conversion image is sufficiently realistic and the structural characteristics of the original image are maintained. So, it means that the semantic information of the original label map obtained from the perspective of the map learning is sufficiently utilized in learning of the generator neural network 120. Furthermore, the loss is capable of being re-analyzed in terms of the joint optimal transport loss between the image and the binding distribution of the label map.

As illustrated in FIG. 3, the image learning method using a generative adversarial network according to the present disclosure can be universally applied to an image dataset combination by computerized tomography, in which there are individual deviations between a region of interest and structural information. In FIG. 3, a "Full mode" is a result of the image learning method using a generative adversarial network according to an embodiment of the present disclosure.

As described above, the present disclosure allows a user to learn various images as well as medical radiographic images to maintain structural information on the basis of a generative adversarial network. The present disclosure prevents the structural information of the generated image with respect to the original image from being lost, and improves image qualities, such as resolution, noise degree, contrast, etc. to the level of a target reference dataset. When the present disclosure is used for image standardization, medical radiographic images imaged by different institutions and any number of image datasets having various qualities can be standardized universally. Moreover, in addition to the standardization quality of the generated image, it is expected to provide a large improvement compared to an existing overfit learning model in successive work performance such as semantic segmentation using the generated image. According to an embodiment of the present disclosure, compared with the standardization technique based on the existing image processing method which is limitingly applicable to a previously secured specific dataset pair, the present disclosure can improve image quality in real time with respect to various dataset combinations.

Meanwhile, each of the elements constituting the image learning apparatus 100 using a generative adversarial network according to an embodiment of the present disclosure can be implemented by including one or more microprocessors.

Additionally, each operation included in the image learning method using a generative adversarial network according to an embodiment of the present disclosure can be implemented in a computer-readable recording medium for recording a computer program programmed to perform the operation.

In addition, each operation included in the image learning method using a generative adversarial network according to an embodiment of the present disclosure can be implemented in the form of a computer program stored in a computer-readable recording medium programmed to perform the operation.

The present disclosure allows to learn various images as well as medical radiographic images to maintain structural information on the basis of a generative adversarial network. The present disclosure prevents the structural information of the generated image with respect to the original image from being lost, and improves image quality, such as resolution, noise degree, contrast, etc. to the level of a target reference dataset. When the present disclosure is used for image standardization, medical radiographic images imaged by different institutions and any number of image datasets having various qualities can be universally standardized.

Combinations of operations in the attached flow charts may be executed by computer program instructions. These computer program instructions may be loaded on a processor of a general-purpose computer, special purpose computer or programmable data processing equipment. When the loaded program instructions are executed by the processor, they create means for carrying out functions described in the operations of the flow chart. As the computer program instructions may be stored in a computer readable memory that is usable in a specialized computer or a programmable data processing equipment, it is also possible to create articles of manufacture that carry out functions described in the operations of the flow chart. As the computer program instructions may be loaded on a computer or a programmable data processing equipment, when executed as processes, they may carry out functions described in the operations of the flow chart.

Additionally, each operation may present a part of a module, a segment or a code containing one or more executable instructions for implementing specific logical functions. In some embodiments, it should be noted that functions described in the operations may be executed in an order different from the above order. For example, two steps illustrated in sequence may be substantially executed at the same time or may be executed in inverse order according to a corresponding function.

As described above, while the present disclosure has been particularly shown and described with reference to the example embodiments thereof, it will be understood by those of ordinary skill in the art that the above embodiments of the present disclosure are all exemplified and various changes, modifications and equivalents may be made therein without changing the essential characteristics and scope of the present disclosure. Therefore, it would be understood that the embodiments disclosed in the present disclosure are not to limit the technical idea of the present disclosure but to describe the present disclosure, and the technical and protective scope of the present disclosure shall be defined by the illustrated embodiments. It should be also understood that the protective scope of the present disclosure is interpreted by the following claims and all technical ideas within the equivalent scope belong to the technical scope of the present disclosure.

The invention claimed is:

1. An image learning method performed by an image learning apparatus using a generative adversarial network, the image learning method comprising the operations of:
   inputting a source domain image and a reference domain image having specific structural information to a mapping neural network training to maximize a loss of a discriminator neural network, obtaining an image style vector of a target reference dataset through an output of the mapping neural network, and providing the obtained image style vector to a generator neural network;
   training to maximize the loss of the discriminator neural network and providing a target domain vector to the generator neural network performing image conversion using the image style vector to obtain a first domain conversion image having different structural information as an output of the discriminator neural network;
   obtaining a second domain conversion image, in which a specific area is randomly emphasized, through a label map-based data random segmentation augmentation of an original image with respect to the first domain conversion image; and
   training to minimize the loss of the discriminator neural network, providing the second domain conversion image as the input image to the discriminator neural network discriminating the input image as any one among a domain generated by the generator neural network and a target domain, and inversely propagating the loss of the discriminator neural network to the mapping neural network and the generator neural network.

2. The image learning method according to claim 1, wherein the loss of the discriminator neural network includes adversarial loss and domain classification loss.

3. The image learning method according to claim 2, wherein the generator neural network and the mapping neural network are trained to discriminate the second domain conversion image as the target domain by the discriminator neural network, and
   wherein the discriminator neural network is trained such that the second domain conversion image is discriminated as a domain generated by the generator neural network.

4. The image learning method according to claim 2, wherein cyclic losses of the generator neural network are opposed to each other.

5. The image learning method according to claim 2, further comprising the operations of:
   inversely propagating a semantic segmentation loss due to the label map-based data random segmentation augmentation to the mapping neural network and the generator neural network,
   wherein the mapping neural network and the generator neural network are trained by following a dice loss between the second domain conversion image and the label map of the original image.

6. An image learning apparatus using a generative adversarial network comprising:
   a mapping neural network, training to maximize a loss of a discriminator neural network, and obtains an image style vector of a target reference dataset and provides the obtained image style vector to a generator neural network when a source domain image and a reference domain image having specific structural information is input;
   the generator neural network, training to maximize a loss of the discriminator neural network, performs image conversion using the image style vector, and outputs a first domain conversion image having different structural information when a target domain vector is input;
   a segmentation augmentation unit outputting a second domain conversion image, in which a specific area is randomly emphasized, through a label map-based data random segmentation augmentation of an original image with respect to the first domain conversion image; and
   the discriminator neural network, training to minimize a loss of the discriminator neural network, discriminates the second domain conversion image input through the segmentation augmentation unit as any one among a domain generated by the generator neural network and a target domain, and inversely propagates the loss of the discriminator neural network to the mapping neural network and the generator neural network.

7. The image learning apparatus according to claim 6, wherein the loss of the discriminator neural network includes adversarial loss and domain classification loss.

8. The image learning apparatus according to claim 7, wherein the generator neural network and the mapping neural network are trained to discriminate the second domain conversion image as the target domain by the discriminator neural network.

9. The image learning apparatus according to claim 7, wherein cyclic losses of the generator neural network are opposed to each other.

10. The image learning apparatus according to claim 7, wherein
   a semantic segmentation loss due to the label map-based data random segmentation augmentation is inversely propagated to the mapping neural network and the generator neural network, and
   wherein the mapping neural network and the generator neural network are trained by following a dice loss between the second domain conversion image and the label map of the original image.

11. A computer program combined with a computer and stored in a computer-readable recording medium to execute the image learning method using a generative adversarial network of claim 1.

12. A computer-readable recording medium storing a computer program, when the computer program is executed by a processor, the computer-readable recording medium comprising the operations of:
  inputting a source domain image and a reference domain image having specific structural information to a mapping neural network training to maximize a loss of a discriminator neural network, obtaining an image style vector of a target reference dataset through an output of the mapping neural network, and providing the obtained image style vector to a generator neural network;
  training to maximize the loss of the discriminator neural network and providing a target domain vector to the generator neural network performing image conversion using the image style vector to obtain a first domain conversion image having different structural information as an output of the discriminator neural network;
  obtaining a second domain conversion image, in which a specific area is randomly emphasized, through a label map-based data random segmentation augmentation of an original image with respect to the first domain conversion image; and
  training to minimize the loss of the discriminator neural network, providing the second domain conversion image as the input image to the discriminator neural network discriminating the input image as any one among a domain generated by the generator neural network and a target domain, and inversely propagating the loss of the discriminator neural network to the mapping neural network and the generator neural network.

13. The computer-readable recording medium according to claim 12, wherein the loss of the discriminator neural network includes adversarial loss and domain classification loss.

14. The computer-readable recording medium according to claim 13, wherein the generator neural network and the mapping neural network are trained to discriminate the second domain conversion image as the target domain by the discriminator neural network.

15. The computer-readable recording medium according to claim 13, wherein cyclic losses of the generator neural network are opposed to each other.

16. The computer-readable recording medium according to claim 13, wherein a semantic segmentation loss due to the label map-based data random segmentation augmentation is inversely propagated to the mapping neural network and the generator neural network, and
  wherein the mapping neural network and the generator neural network are trained by following a dice loss between the second domain conversion image and the label map of the original image.

* * * * *